US009438768B2

(12) United States Patent
Marugame et al.

(10) Patent No.: US 9,438,768 B2
(45) Date of Patent: Sep. 6, 2016

(54) IMAGE PROCESSING APPARATUS, IMAGE READING APPARATUS, IMAGE PROCESSING METHOD AND INFORMATION STORAGE MEDIUM

(75) Inventors: Atsushi Marugame, Tokyo (JP); Tomoharu Kiyuna, Tokyo (JP)

(73) Assignee: NEC Corporation, Tokyo (JP)

( * ) Notice: Subject to any disclaimer, the term of this patent is extended or adjusted under 35 U.S.C. 154(b) by 646 days.

(21) Appl. No.: 13/637,694

(22) PCT Filed: Mar. 9, 2011

(86) PCT No.: PCT/JP2011/001383
§ 371 (c)(1),
(2), (4) Date: Sep. 27, 2012

(87) PCT Pub. No.: WO2011/121900
PCT Pub. Date: Oct. 6, 2011

(65) Prior Publication Data
US 2013/0011036 A1    Jan. 10, 2013

(30) Foreign Application Priority Data

Mar. 30, 2010  (JP) ................................ 2010-079393

(51) Int. Cl.
*G06T 11/00* (2006.01)
*H04N 1/407* (2006.01)
*H04N 1/60* (2006.01)

(52) U.S. Cl.
CPC .............. *H04N 1/4072* (2013.01); *H04N 1/60* (2013.01)

(58) Field of Classification Search
None
See application file for complete search history.

(56) References Cited

U.S. PATENT DOCUMENTS

| 5,938,600 | A  | * | 8/1999  | Van Vaals et al. ........... 600/411 |
| 6,069,974 | A  | * | 5/2000  | Tsukada et al. .............. 382/170 |
| 6,718,053 | B1 |   | 4/2004  | Ellis et al. |
| 6,788,816 | B1 | * | 9/2004  | Kiyuna ......................... 382/199 |
| 7,136,540 | B2 |   | 11/2006 | Kiyuna |
| 7,916,942 | B1 | * | 3/2011  | Ohara ........................... 382/168 |
| 8,000,777 | B2 | * | 8/2011  | Jaeb et al. .................... 600/476 |
| 8,068,133 | B2 |   | 11/2011 | Arai et al. |
| 8,275,450 | B2 | * | 9/2012  | Winchester et al. .......... 600/479 |
| 8,401,290 | B2 | * | 3/2013  | Taylor et al. ................. 382/172 |
| 2002/0079362 | A1 | * | 6/2002 | Tsuchino ............... G03B 42/08 235/380 |
| 2002/0168096 | A1 | * | 11/2002 | Hakamata et al. ........... 382/132 |
| 2002/0186882 | A1 | * | 12/2002 | Cotman ............. G06K 9/00127 382/165 |

(Continued)

FOREIGN PATENT DOCUMENTS

CN    1553166 A    12/2004
JP    3534009 B2    6/2004

(Continued)

*Primary Examiner* — Chan Park
*Assistant Examiner* — Mia M Thomas
(74) *Attorney, Agent, or Firm* — Foley & Lardner LLP

(57) ABSTRACT

The invention is directed to a reduction in the influence on a pathological diagnosis when an image reading apparatus is exchanged. In order to solve the above-mentioned problem, there is provided an image processing apparatus that processes a biological image generated by capturing an image of a biological specimen in an image reading apparatus, including: an acquisition unit that acquires identification information of the image reading apparatus; a determination unit that determines a type of biological tissue included in the biological image; and a correction unit that adds a correction process to the biological image in correspondence with the identification information of the image reading apparatus and the type of biological tissue.

17 Claims, 11 Drawing Sheets

(56) References Cited

U.S. PATENT DOCUMENTS

| | | | | |
|---|---|---|---|---|
| 2003/0194132 A1* | | 10/2003 | Kiyuna | 382/190 |
| 2004/0032622 A1* | | 2/2004 | Tezuka | H04N 1/32 358/302 |
| 2004/0086163 A1* | | 5/2004 | Moriyama | A61B 6/00 382/131 |
| 2004/0170309 A1* | | 9/2004 | Hughes et al. | 382/128 |
| 2005/0107961 A1* | | 5/2005 | Uemura | G06F 19/20 702/20 |
| 2005/0152880 A1* | | 7/2005 | Mills et al. | 424/93.7 |
| 2005/0250998 A1* | | 11/2005 | Huiku | 600/331 |
| 2006/0027749 A1* | | 2/2006 | Kurihara et al. | 250/341.5 |
| 2006/0073509 A1 | | 4/2006 | Kilpatrick et al. | |
| 2006/0279800 A1* | | 12/2006 | Fukui et al. | 358/453 |
| 2007/0090178 A1* | | 4/2007 | Fujii | G05B 19/0428 235/375 |
| 2007/0091324 A1* | | 4/2007 | Paul et al. | 356/623 |
| 2007/0195061 A1* | | 8/2007 | Nakamura | A61B 6/465 345/158 |
| 2007/0269085 A1* | | 11/2007 | Oshiro et al. | 382/128 |
| 2008/0071162 A1* | | 3/2008 | Jaeb et al. | 600/407 |
| 2008/0114242 A1* | | 5/2008 | Chang | A61B 8/08 600/443 |
| 2008/0268456 A1 | | 10/2008 | Kilpatrick et al. | |
| 2008/0285837 A1 | | 11/2008 | Kilpatrick et al. | |
| 2009/0103796 A1* | | 4/2009 | Akagi | A61B 6/4283 382/132 |
| 2009/0253145 A1 | | 10/2009 | Kilpatrick et al. | |
| 2009/0313049 A1* | | 12/2009 | Joao | G06F 19/322 705/3 |
| 2010/0021028 A1* | | 1/2010 | Kiyuna | 382/128 |
| 2010/0054560 A1* | | 3/2010 | Yamashita | A61B 5/055 382/128 |
| 2011/0026063 A1* | | 2/2011 | Nakai et al. | 358/1.14 |
| 2011/0034810 A1* | | 2/2011 | Winchester et al. | 600/476 |
| 2011/0057946 A1* | | 3/2011 | Yamamoto | G06K 9/00134 345/589 |
| 2011/0058722 A1* | | 3/2011 | Hu et al. | 382/131 |
| 2011/0064316 A1* | | 3/2011 | Hamamura | G06K 9/6278 382/218 |
| 2011/0093047 A1* | | 4/2011 | Davis | A61N 1/372 607/60 |
| 2011/0128299 A1* | | 6/2011 | Wakita | G06T 1/00 345/629 |
| 2011/0246521 A1* | | 10/2011 | Luo et al. | 707/776 |
| 2011/0306880 A1* | | 12/2011 | Li | A61B 8/08 600/439 |
| 2011/0319744 A1* | | 12/2011 | Tsujita et al. | 600/407 |
| 2012/0075453 A1 | | 3/2012 | Kilpatrick et al. | |
| 2012/0162368 A1* | | 6/2012 | Choi | 348/45 |
| 2012/0281497 A1* | | 11/2012 | Noguchi | A61B 8/5223 367/7 |
| 2014/0362204 A1* | | 12/2014 | Watanabe | G02B 21/365 348/79 |
| 2015/0023592 A1* | | 1/2015 | Kiyuna | G06T 7/408 382/164 |
| 2015/0072371 A1* | | 3/2015 | Marugame | G01N 33/4833 435/29 |
| 2015/0342571 A1* | | 12/2015 | Ohuchi | A61B 8/0883 382/128 |
| 2016/0004932 A1* | | 1/2016 | Sano | G06F 19/321 382/128 |

FOREIGN PATENT DOCUMENTS

| | | |
|---|---|---|
| JP | 3649328 B2 | 5/2005 |
| JP | 2005-142002 A | 6/2006 |
| JP | 2006-350740 A | 12/2006 |
| JP | 2008-51654 A | 3/2008 |
| JP | 2008-309685 A | 12/2008 |
| JP | 2009-511002 A | 3/2009 |
| JP | 2009-168725 A | 7/2009 |
| JP | 2009-229203 A | 10/2009 |

\* cited by examiner

FIG. 5

| | BIOLOGICAL TISSUE TYPE | RGB HISTOGRAM | | | HSV HISTOGRAM | | |
|---|---|---|---|---|---|---|---|
| | | R | G | B | H | S | V |
| STANDARD SCANNER | BLANK | ⋀ | ⋀ | ⋀ | - | — | ⋀ |
| SCANNER ID | GLANDULAR DUCT | ⋀ | ⋀ | ⋀ | ⋀ | ⋀ | ⋀ |
| MAKER NAME | STROMA | ⋀ | ⋀ | ⋀ | ⋀ | ⋀ | ⋀ |
| PRODUCT TYPE | LYMPHOCYTE | ⋀ | ⋀ | ⋀ | ⋀ | ⋀ | ⋀ |
| PRODUCT NUMBER | HEMOCYTE | ⋀ | ⋀ | ⋀ | ⋀ | ⋀ | ⋀ |
| | ⋮ | | | | | | |

| SCANNER IDENTIFICATION INFORMATION | BIOLOGICAL TISSUE TYPE | RGB (0-255) CORRECTION VALUE | | | HSV (0-1) CORRECTION VALUE | | |
|---|---|---|---|---|---|---|---|
| | | R | G | B | H | S | V |
| SCANNER A<br>SCANNER ID:*<br>MAKER NAME:*<br>PRODUCT TYPE:*<br>PRODUCT NUMBER:* | BLANK | – | – | – | 0 | 0 | +0.3 |
| | GLANDULAR DUCT | – | – | – | 0 | +0.2 | +0.3 |
| | STROMA | – | – | – | +0.1 | +0.1 | +0.1 |
| | LYMPHOCYTE | – | – | – | 0 | +0.1 | +0.1 |
| | HEMOCYTE | – | – | – | 0 | 0 | +0.2 |
| | ⋮ | ⋮ | ⋮ | ⋮ | ⋮ | ⋮ | ⋮ |
| SCANNER B<br>SCANNER ID:+++<br>MAKER NAME:+++<br>PRODUCT TYPE:+++<br>PRODUCT NUMBER:+++ | BLANK | 0 | –15 | –15 | – | – | – |
| | GLANDULAR DUCT | +8 | +8 | +8 | – | – | – |
| | STROMA | +2 | +2 | +7 | – | – | – |
| | LYMPHOCYTE | +2 | +2 | +2 | – | – | – |
| | HEMOCYTE | +1 | +1 | +1 | – | – | – |
| | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ |

IMAGE PROCESSING APPARATUS, IMAGE READING APPARATUS, IMAGE PROCESSING METHOD AND INFORMATION STORAGE MEDIUM

This application is the National Phase of PCT/JP2011/001383, filed Mar. 9, 2012, which claims priority to Japanese Application No. 2010-079393, filed Mar. 30, 2010, the disclosures of which are hereby incorporated by reference in their entirety.

TECHNICAL FIELD

The present invention relates to a technique for processing a biological image.

BACKGROUND ART

As a type of technique for reading an image of a biological specimen and adding an image process, Patent Document 1 discloses an apparatus that automatically analyzes a biological specimen image. The apparatus has a microscope including a CCD camera, and adds a process to a biological specimen image magnified using a microscope to display the image on a monitor. In addition, the apparatus is configured such that the positional coordinates of a specimen and a captured image are stored in association with an identifier (bar code) of the specimen, an image of the specimen is captured while feeding a slide automatically to arrange the specimen at proper positions, and a pathological diagnosis by a pathologist is supported.

RELATED DOCUMENT

Patent Document

[Patent Document 1] U.S. patent application Ser. No. 09/495,461

DISCLOSURE OF THE INVENTION

However, in the above-mentioned system of the related art, there is no mention of the case where an image reading apparatus such as a microscope is replaced. The system is not preferred because, for example, when a microscope or a CCD is replaced with others, read image data, the hue of an image displayed on a monitor, or the like is changed, the pathological diagnosis itself is possibly influenced.

An object of the invention is to provide a technique for solving the above-mentioned problem.

In order to achieve the above-mentioned object, there is provided an image processing apparatus that processes a biological image generated by capturing an image of a biological specimen in an image reading apparatus, including: an acquisition unit that acquires identification information of the image reading apparatus; a determination unit that determines a type of biological tissue included in the biological image; and a correction unit that adds a correction process to the biological image in correspondence with the identification information of the image reading apparatus and the type of biological tissue.

In order to achieve the above-mentioned object, there is provided an image processing apparatus that processes a biological image generated by capturing an image of a biological specimen in an image reading apparatus, including: an acquisition unit that acquires identification information of the image reading apparatus; a generation unit that compares a standard image previously stored in a database with the biological image, derives a correction process to be added to the biological image in order to cause approximation to the standard image, and generates correction information indicating the correction process; and a registration unit that registers the identification information of the image reading apparatus and the correction information in the database, in association with a type of biological tissue included in the biological image.

In order to achieve the above-mentioned object, there is provided an image reading apparatus which is capable of being connected to the above-mentioned image processing apparatus, including: a transmission unit that transmits the biological image generated by capturing an image of the biological specimen and the identification information to the image processing apparatus.

In order to achieve the above-mentioned object, there is provided an image reading apparatus which is capable of being connected to the above-mentioned image processing apparatus, including: a storage unit that stores correction information indicating the correction process for each type of biological tissue capable of being included in the biological image; and a transmission unit that transmits the biological image generated by capturing an image of the biological specimen and the correction information to the image processing apparatus.

In order to achieve the above-mentioned object, there is provided an image reading apparatus which is capable of being connected to the above-mentioned image processing apparatus, including: a storage unit that stores the biological image generated by capturing an image of the sampling biological specimen; and a transmission unit that transmits the biological image to the image processing apparatus.

In order to achieve the above-mentioned object, there is provided an image processing method that processes a biological image generated by capturing an image of a biological specimen in an image reading apparatus, including: acquiring identification information of the image reading apparatus; determining a type of biological tissue included in the biological image; and adding a correction process to the biological image in correspondence with the identification information of the image reading apparatus and the type of biological tissue.

In order to achieve the above-mentioned object, there is provided an image processing method that processes a biological image generated by capturing an image of a biological specimen in an image reading apparatus, including: acquiring identification information of the image reading apparatus; comparing a standard image previously stored in a database with the biological image, deriving a correction process to be added to the biological image in order to cause approximation to the standard image, and generating correction information indicating the correction process; and registering the identification information of the image reading apparatus and the correction information, in association with a type of biological tissue included in the biological image.

In order to achieve the above-mentioned object, there is provided an image processing program that processes a biological image generating by capturing an image of a biological specimen in an image reading apparatus, the program causing a computer to execute: a step of acquiring identification information of the image reading apparatus; a step of determining a type of biological tissue included in the biological image; and a step of adding a correction process to the biological image in correspondence with the identification information of the image reading apparatus and the type of biological tissue.

In order to achieve the above-mentioned object, there is provided an image processing program that processes a biological image generated by capturing an image of a biological specimen in an image reading apparatus, the program causing a computer to execute: a step of acquiring identification information of the image reading apparatus; a step of comparing a standard image previously stored in a database with the biological image, deriving a correction process to be added to the biological image in order to cause approximation to the standard image, and generating correction information indicating the correction process; and a step of registering the identification information of the image reading apparatus and the correction information, in association with a type of biological tissue included in the biological image.

According to the invention, it is possible to reduce the influence on a pathological diagnosis when an image reading apparatus is exchanged.

BRIEF DESCRIPTION OF THE DRAWINGS

FIG. 5 is a diagram illustrating generated correction information in the image reading system as the third embodiment of the invention.

FIG. 6 is a diagram illustrating reference information for generating correction information in the image reading system as the third embodiment of the invention.

DESCRIPTION OF EMBODIMENTS

Hereinafter, embodiments of the invention will be exemplarily described in detail with reference to the drawings. However, components mentioned in the following embodiments are merely illustrative of the invention, and the technical scope of the invention is not limited thereto.

First Embodiment

Figure 1:
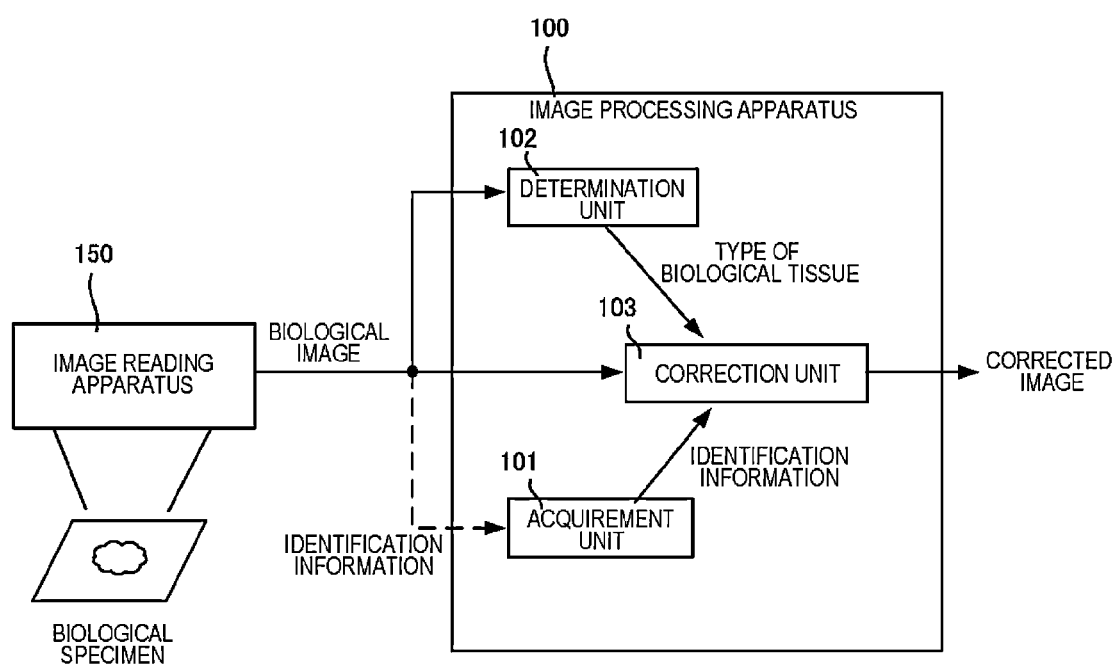
FIG. 1 is a diagram illustrating a configuration of an image processing apparatus as a first embodiment of the invention.

FIG. 1 is a diagram illustrating a configuration of an image processing apparatus 100 as a first embodiment of the invention. In FIG. 1, the image processing apparatus 100 is connected to an image reading apparatus 150, and processes a biological image generated by capturing an image of a biological specimen in the image reading apparatus 150. The image processing apparatus 100 includes an acquirement unit 101, a determination unit 102, and a correction unit 103. Among them, the acquirement unit 101 acquires identification information of the image reading apparatus 150. The determination unit 102 determines the type of biological tissue included in the biological image sent from the image reading apparatus 150. In addition, the correction unit 103 corrects the biological image in correspondence with identification information of the image reading apparatus 150 and the type of determined biological tissue.

According to such an image processing apparatus 100, it is possible to add a correction depending on the type of biological tissue included in the biological image which is read by the image reading apparatus 150, and to obtain a corrected image by which an image diagnosis is more easily performed.

Second Embodiment

Figure 2:
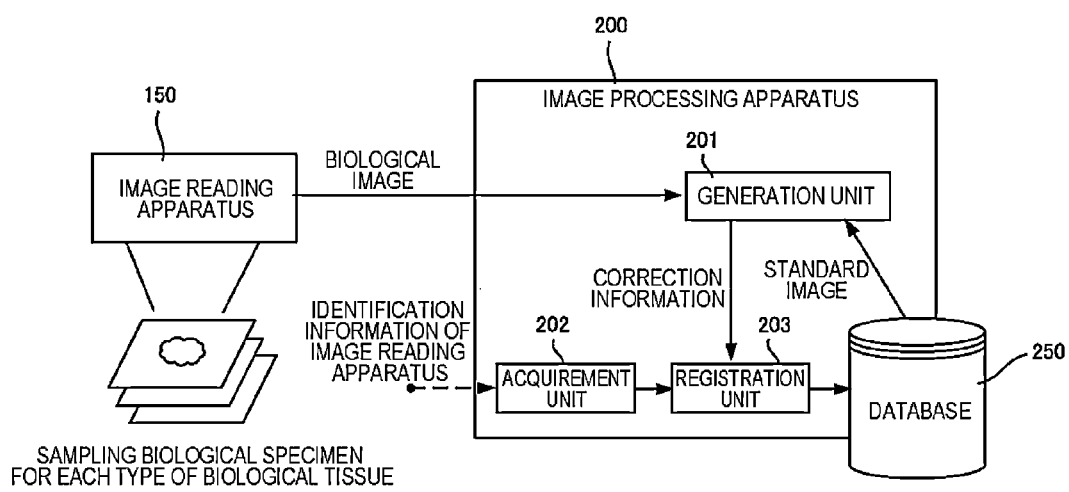
FIG. 2 is a diagram illustrating a configuration of an image processing apparatus as a second embodiment of the invention.

FIG. 2 is a diagram illustrating a configuration of an image processing apparatus 200 as a second embodiment of the invention. In FIG. 2, the image processing apparatus 200 is connected to the image reading apparatus 150, and includes a generation unit 201, an acquirement unit 202 and a registration unit 203. Among them, the generation unit 201 compares a biological image acquired from the image reading apparatus 150 with a standard image which is read out from a database 250, determines what type of correction process may be added in order to cause the acquired biological image to approximate to the standard image, and derives an effective correction process. Correction information indicating the correction process is generated. On the other hand, the acquirement unit 202 acquires identification information of the image reading apparatus 150. The registration unit 203 registers the identification information of the image reading apparatus 150 and the generated correction information in the database 250, in association with the type of biological tissue included in the biological image.

Meanwhile, the term "standard image" herein is, for example, an image acquired by capturing an image of a sampling biological specimen in a standard image reading apparatus. When a biological image acquired by capturing an image of the same sampling biological specimen in an image reading apparatus different from the standard image reading apparatus in type and such a standard image are compared with each other, it is possible to derive a correction process to be added in order to obtain the biological image close to the standard image.

In this manner, the image processing apparatus 200 derives the correction process to be added in order to obtain an image close to the standard image, thereby allowing the correction information to be registered in the database. For this reason, even when the image reading apparatus 150 of which the image reading characteristics (brightness, hue, blurring or the like) are unclear is connected, a proper correction process is added, thereby allowing an image close to the standard image to be acquired. That is, it is possible to provide an image processing apparatus excellent in versatility which can cope with various image reading apparatuses.

Third Embodiment

Figure 3:
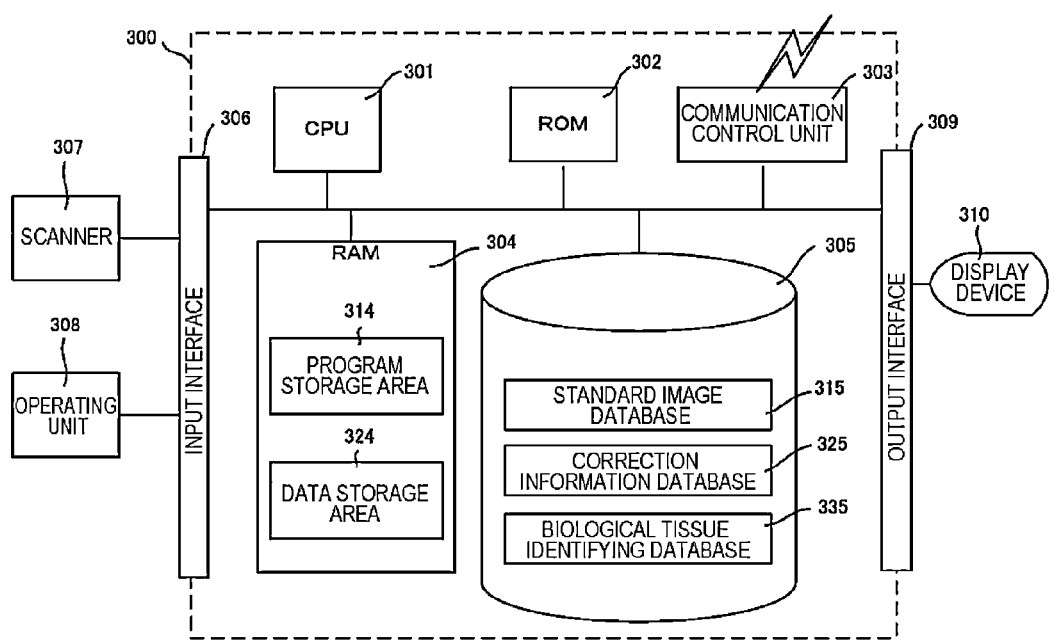
FIG. 3 is a diagram illustrating a configuration of an image reading system as a third embodiment of the invention.

FIG. 3 is a diagram illustrating a configuration of an image processing apparatus 300 as a third embodiment of the invention. In FIG. 3, the image processing apparatus 300 includes a CPU 301, a ROM 302, a communication control unit 303, a RAM 304, a mass-memory unit 305, an input interface 306, and an output interface 309. The image processing apparatus 300 is connected to a scanner 307 used as an image reading apparatus and an operating unit 308 through the input interface 306, and acquires image information from the scanner 307 in accordance with an operation added to the operating unit 308. In addition, the image processing apparatus 300 is connected to a display device 310 through the output interface 309, and can display an image which is read by the scanner 307 or an image processed in the image processing apparatus 300, on the display device 310. In addition, the display device 310 also functions as a notice unit that gives notice of an error message and the like.

On the other hand, in the inside of the image processing apparatus 300, the CPU 301 is a central processing unit that controls the entirety of the device. In addition, the ROM 302 is a read-only memory, and stores a boot program executed by the CPU 301 or various types of parameters. In addition, the communication control unit 303 is connected to an external network, and controls, for example, communication with a database provided to the outside or a computer.

The RAM 304 includes a program storage area 314 that temporarily stores a plurality of programs executed by the CPU 301 and a data storage area 324 that temporarily stores data used for these programs.

Further, the mass-memory unit 305 includes a standard image database 315 that stores information on a standard image which is read by a standard scanner used as a standard image reading apparatus and a correction information database 325 used as a storage unit that stores information on the scanner 307 connected to the image processing apparatus 300 and correction information. Further, the mass-memory unit 305 includes a biological tissue identifying database 335 that stores information for identifying biological tissue from a biological image which is read by a scanner.

FIG. 5 shows a portion of contents of the standard image database. A table 500 shown in FIG. 5 stores a RGB histogram 503 and an HSV histogram 504 for each type 502 of captured biological tissue, in association with identification information 501 of the standard scanner. The types of biological tissue herein include a "glandular duct", a "stroma", a "lymphocyte", and a "hemocyte", and each histogram is also stored in a "blank" region in which biological tissue is not present. The RGB histogram is expressed by, for example, 256 gray scales from 0 to 255, and the number of pixels having pixel values from 0 to 255 is set to a vertical axis.

For example, the "blank" region takes a high numerical value together with R, G, and B because it is close to white. In addition, since staining is performed using hematoxylin and eosin in the standard image, the "glandular duct" is stained in pink as a whole, and the surroundings of the glandular duct are stained in blue. In other words, the pixel of R tends to have a relatively large value, and the pixel of B and the pixel of G have increasingly smaller values in this order. On the other hand, in the image region obtained by capturing an image of the lymphocyte, blueness is slightly strong, and thus the pixel of B takes a large value. On the contrary, in the image region obtained by capturing an image of the hemocyte, redness is considerably strong, and thus both the pixel of B and the pixel of G take a small value.

Similarly, the number of pixels as a standard value is also stored in the HSV histogram 504 in each region, with respect to luminosity V indicating the brightness of an image, chroma S indicating the vividness of a color, and hue H of a chromatic color. Basically, peaks of these histograms are important, and a conversion process of the tint or the brightness is also added to an image captured by another scanner so that the peaks of the histograms are present in the same positions as those stored in the table 500.

Meanwhile, standard image data shown in FIG. 5 is just illustrative, and it is necessary to store information depending on a correction method added to a biological image captured by a new scanner (scanner other than the standard scanner). For example, when the biological image and the standard image are compared to each other, it is possible to use an average value of the pixel values of each color element instead of the histograms, or to use an intermediate value. In such a case, it is necessary to previously register the average value or the intermediate value in the table 500.

[Configuration of Various Types of Modules]

Figure 4:
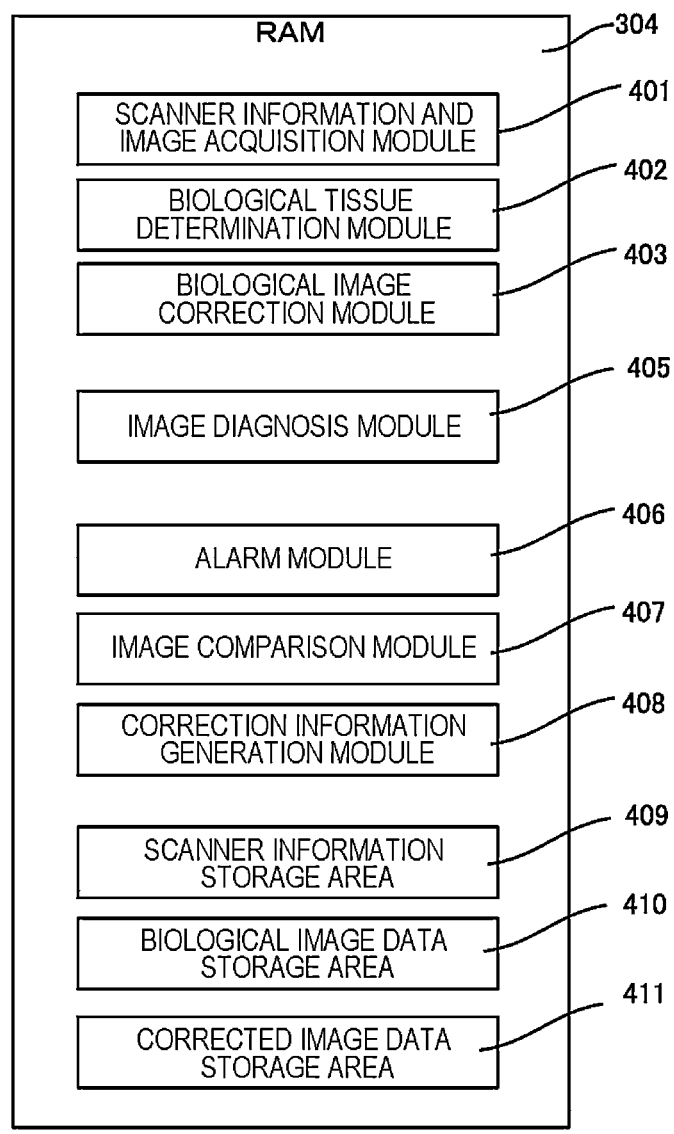
FIG. 4 is a diagram illustrating a module and data which are stored in a RAM, in the image reading system as the third embodiment of the invention.

The details of the module and the data stored inside the RAM 304 will be described with reference to FIG. 4. The RAM 304 includes a scanner information and image acquisition module 401 for acquiring information on the scanner 307 and a biological image which is read by the scanner 307. The scanner information acquired by the scanner information and image acquisition module 401 is temporarily stored in a scanner information storage area 409. In addition, the biological image data acquired by the scanner information and image acquisition module 401 is temporarily stored in a biological image data storage area 410.

In addition, the RAM 304 includes a biological tissue determination module 402 that determines the type of biological tissue present in the biological image which is read by the scanner 307 and the image region thereof. The type of biological tissue present in the biological image includes, for example, a glandular duct (cell nucleus group), a stroma (cytoplasm), a lymphocyte, a hemocyte, other goblet cells (heterocyst) and the like. It is determined where the biological tissue in the acquired biological image in what type of form and size, using an image processing technique such as pattern matching. A tissue determination technique or a region extraction technique used herein is disclosed in documents of a glandular duct (Japanese Unexamined Patent Application No. 2009-229203), a lymphocyte (Japanese Unexamined Patent Application No. 2009-168725, Japanese Patent No. 3649328, and Japanese Patent No. 3534009) and the like, and thus detailed descriptions herein will not be repeated.

On the other hand, the RAM 304 also includes a biological image correction module 403 for adding correction to a biological image. The biological image correction module adds a correction process to the biological image on the basis of correction information which is previously prepared, for each piece of scanner information that identifies a scanner and for each biological tissue. Corrected image data generated by a correction process is stored in a corrected image data storage area 411.

Further, the RAM 304 includes an image diagnosis module 405, and analyzes the corrected image data stored in the corrected image data storage area 411 to perform a pathological diagnosis. Specifically, for example, it is determined what kind of lesion is included using processes such as a hematoxylin signal analysis, image normalization, nuclear detection, a texture analysis, a color analysis, lesion candidate extraction, and identification of a lesion, and the resultant is presented to a pathologist.

The RAM 304 further includes an alarm module 406. The alarm module 406 displays that the image correction is performed by the biological image correction module 403.

In addition, when scanner information acquired from the connected scanner 307 is not registered in the correction information database 325, the alarm module 406 displays an alarm that calibration is required. At the time of calibration, an image comparison module 407 compares the biological image acquired by capturing an image of the sampling biological specimen using the scanner 307 with the standard image (corresponding to the sampling biological specimen) which is previously prepared in the standard image database 315. A correction information generation module 408 stored in the RAM 304 generates correction information in accordance with the comparison result in the image comparison module 407. That is, in order to cause the acquired biological image to approximate to the standard image, it is determined whether the difference derived in the comparison process decreases when what types of correction process are added, and an effective correction process is derived.

As mentioned above, the image comparison module 407 can obtain the difference by comparing the histograms, the intermediate values, the average values or the like of HSV color elements, RGB color elements, or CMYK color elements of the images. In that case, the correction information generation module 408 performs correction for removing the difference.

The image comparison module 407 may normalize an image through a gamma correction separate a white region and a colored region from each other through a discriminant analysis of the chrome and the luminosity, separate a colored region into a red region and a blue region through a discriminant analysis of the hue, and compare averages of RGB with respect to each of the white, red, and blue regions. In other words, the average of the R pixel value in the biological image and the average of the R pixel value in the standard image may be compared to each other, and the G pixel value and the B pixel value may be further compared to each other similarly, to take the differences, respectively. In this case, the correction information generation module 408 also performs corrections for removing the differences.

In addition, the image comparison module 407 may compare, for example, blurring of the biological image and blurring of the standard image to each other, and the correction information generation module 408 may perform a correction for removing the difference. In this case, the image comparison module 407 first performs a discrete cosine transform (DCT) on each component of RGB of the biological image and the standard image, and removes a direct-current component (sets the component to 0) from the DCT result. Next, total power of only an alternating-current component is calculated, low-pass total power is calculated in which X and Y are equal to or less than a fixed ratio (for example, equal to or less than 2%) in the DCT (only the alternating-current), and the ratio of low-pass total power to alternating current total power is calculated. This ratio is considered to be a blurring amount, and the ratio is derived to perform comparison with respect to each image.

The correction information obtained in the manner is stored in the correction information database 325. A table 600 shown in FIG. 6 shows an example of correction information 603 stored in association with identification information 601 of the scanner. Similarly to the standard image data shown in FIG. 5, the correction information 603 is also registered for each type 602 of biological tissue.

In this example, two kinds of RGB correction value and HSV correction value of the correction information 603 are prepared, and a color space which is easily corrected can be selected in accordance with the type of the scanner. In addition, herein, as the correction values, values represented by values from −1 to +1 are taken in the case of the HSV color space, and values represented by values from −255 to +255 are taken in the case of the RGB space.

[Flow of Operations]

Figure 7:
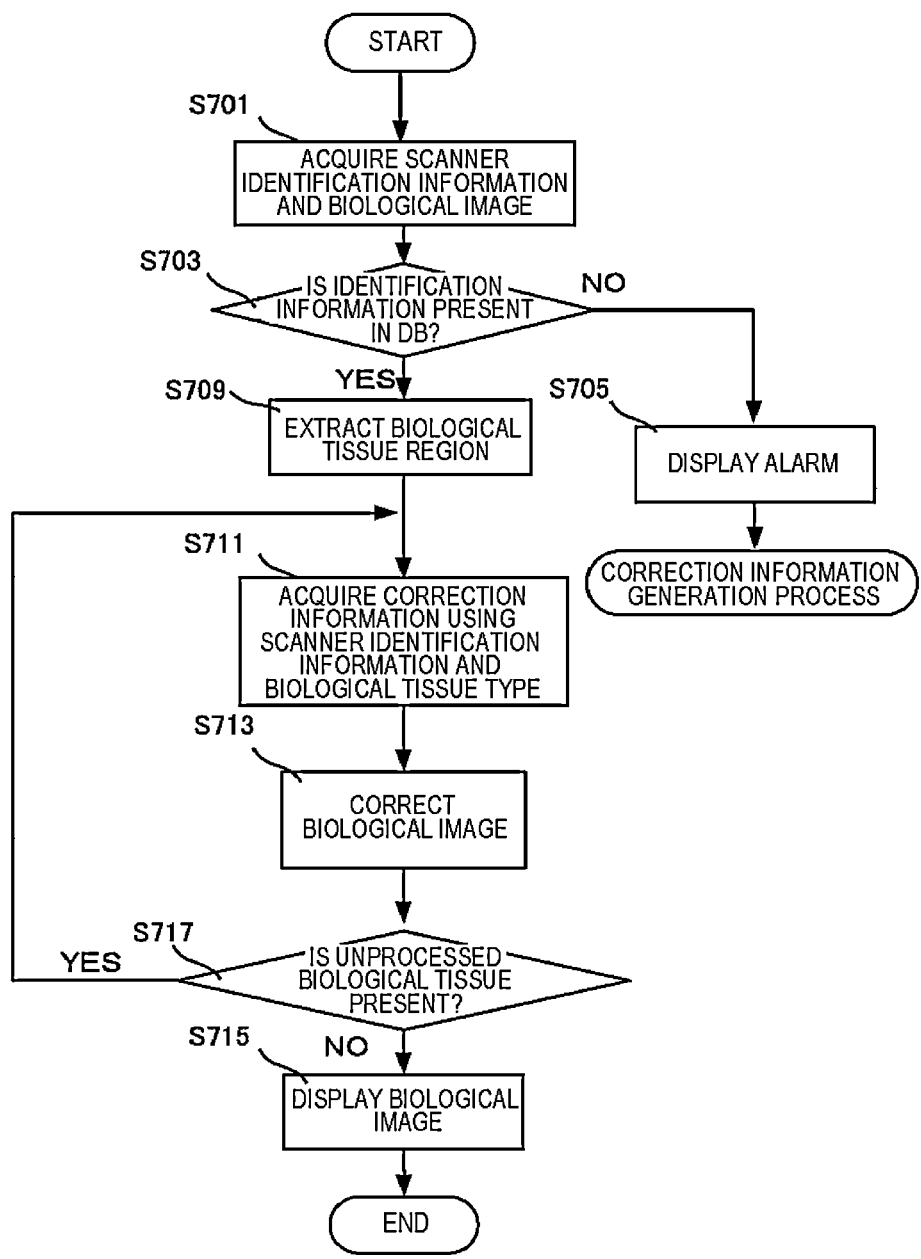
FIG. 7 is a flow diagram illustrating a flow of processes in the image reading system as the third embodiment of the invention.

Next, a flow of processes executed in the image processing apparatus 300 according to the embodiment will be described with reference to flow diagrams of FIGS. 7 and 8.

First, in step S701, identification information of the connected scanner 307 and a biological image which is read by the scanner 307 are acquired. Herein, for example, the identification information of the scanner 307 can be extracted from a header of biological image data which is read by the scanner 307.

Next, in step S703, it is determined whether the extracted identification information is registered in the standard image database 315 or the correction information database 325. When the information is not registered in either of them, it is known that the connected scanner 307 is not the standard scanner used at the time of generating the standard image, and is also not the scanner in which the correction information is already generated. In this case, the process proceeds to step S705, and an alarm display is performed. Specifically, a message indicating that it is necessary to read the sampling biological specimen and perform calibration is displayed, the process proceeds to a correction information generation process.

When it is determined in step 703 that the identification information is registered in the database, the process proceeds to step S709, and a biological tissue region is extracted from the acquired biological image. Next, in step S711, correction information is acquired from the correction information database 325, using the scanner identification information and the type of the extracted biological tissue.

In step S713, the acquired biological image is corrected using the acquired correction information. Herein, for example, when the number of biological tissue types included in the biological image is one, the entirety of the biological image may be corrected by a correction method in correspondence to the biological tissue type. In addition, when two types or more of biological tissue are included in the biological image, the image correction may be performed by a different correction method for each image region including each biological tissue. In any case, the correction is performed depending on the type of biological tissue included in the biological image, so that the discrimination and the analysis of the biological tissue are facilitated, and furthermore, accuracy of a pathological diagnosis is improved.

When the correction of the biological image in step S713 is terminated, the process proceeds to step S717, and it is determined whether unprocessed biological tissue is present. When the biological tissue in which the correction process is not terminated is included in the biological image, the process proceeds to steps S711 and S713, and the image correction is performed on the next biological tissue.

When the image correction process is terminated with respect to all of the biological tissue included in the biological image, the process proceeds to step S715. The biological image after the correction is then displayed on the display device 310, and the process is terminated.

Figure 8:
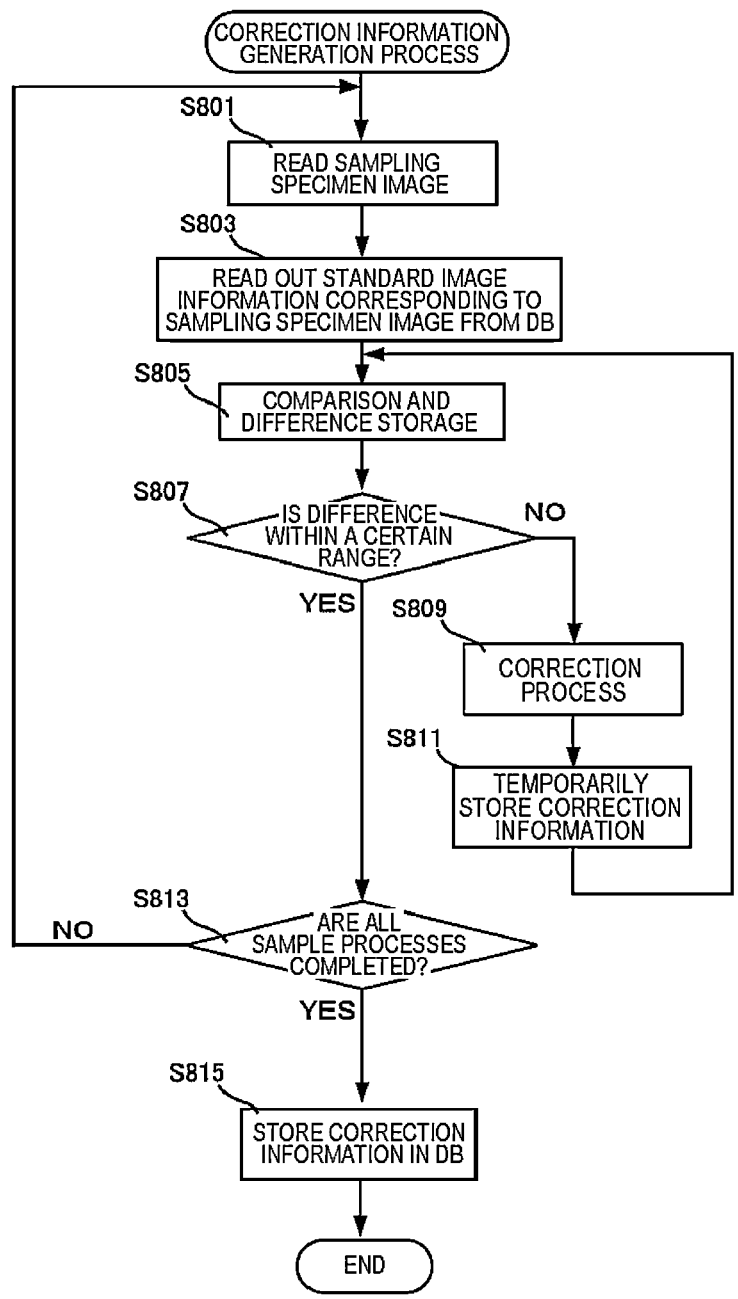
FIG. 8 is a flow diagram illustrating a flow of processes in the image reading system as the third embodiment of the invention.

FIG. 8 is a flow diagram illustrating the details of the correction information generation process performed after step S705. Since it is determined in step S705 that the connected scanner 307 is not the standard scanner, in FIG. 8, image reading of the sampling biological specimen is first performed in step S801. The term "sampling specimen" herein is a specimen which is previously prepared in order to generate the correction information, and is preferably the same as the specimen of which the image is captured by the standard scanner at the time of generating the standard image. Meanwhile, a different sampling specimen may be prepared for each type of biological tissue, and a plurality of biological tissues may be included in one sampling specimen.

Next, in step S803, standard image information corresponding to a sampling specimen image is read out from the standard image database 315. In step S805, the image comparison module 407 is executed, so that information of the read image and information of the standard image are compared to each other based on predetermined indexes (for example, luminosity, chroma, hue and the like) as mentioned above, and the differences are stored. Next, in step S807, it is determined whether the differences obtained by comparing the predetermined indexes of these images are in accord with each other or are within a certain range. When the differences are within a certain range, the process proceeds to step S813, and it is determined whether processing is completed with respect to all of the sampling specimens which are previously prepared. When the next sampling specimen is present, the process returns to step S801.

When the difference between the biological image generated by capturing an image of the sampling specimen and the standard image is not within a certain range in step S807, the process proceeds to step S809, the image information of the biological image is corrected in the direction in which the difference becomes smaller, and the correction information is temporarily stored in step S811. The correction process is repeated until the difference between the corrected image and the standard image is within a certain range, and the process proceeds to step S813 when it is within a certain range. For example, in the case of comparison with the image information represented by the HSV color space, only luminosity V of the image is first matched to the standard image, comparison with the entirety of the image is performed. Nevertheless, when the correction is not sufficiently performed, chroma S is matched to the standard image. Nevertheless, when the correction is not sufficiently performed, the hue is gradually displaced and thus the difference between the images is caused to be within a certain range. In this way, it is possible to obtain a similar image through a minimum correction. Basically, since the correction process regarding the image which is read from the scanner 307 is preferably performed to a minimum, the correction information is set by such a step-by-step correction process. Meanwhile, in step S805, the biological tissue may be extracted for each correction process, and images of a region of the extracted biological tissue may be compared to each other.

When it is determined in step S813 that the correction information generation process of all of the sampling specimen images is terminated, the process proceeds to step S815, and the correction information is stored in the correction information database 325 in association with the type of biological tissue.

Even when a totally new scanner is connected through the above-mentioned processes, it is possible to generate and store the correction information so that the corrected image close to the standard image can be output. Meanwhile, in the above-mentioned embodiment, although the correction information database 325 is provided within the image processing apparatus, the correction information may be previously stored in the scanner 307, and the biological image and the correction information may be transmitted to the image processing apparatus 300. In that case, the scanner 307 includes a storage unit (for example, ROM) that stores the correction information indicating the correction process for each type of biological tissue capable of being included in the biological image. In that case, the scanner 307 further includes a transmission unit that transmits the biological image generated by capturing an image of the biological specimen and the correction information read out from the storage unit to the image processing apparatus 300. On the other hand, it is preferable that the scanner 307 previously stores the biological image generated by capturing an image of the sampling biological specimen. In that case, the storage unit that stores the biological image indicating the sampling biological specimen and the transmission unit that transmits the biological image readout from the storage unit to the image processing apparatus 300 may be included.

Specific Example

A specific example of the correction process will be described with reference to FIGS. 9 to 11.

Figure 9:
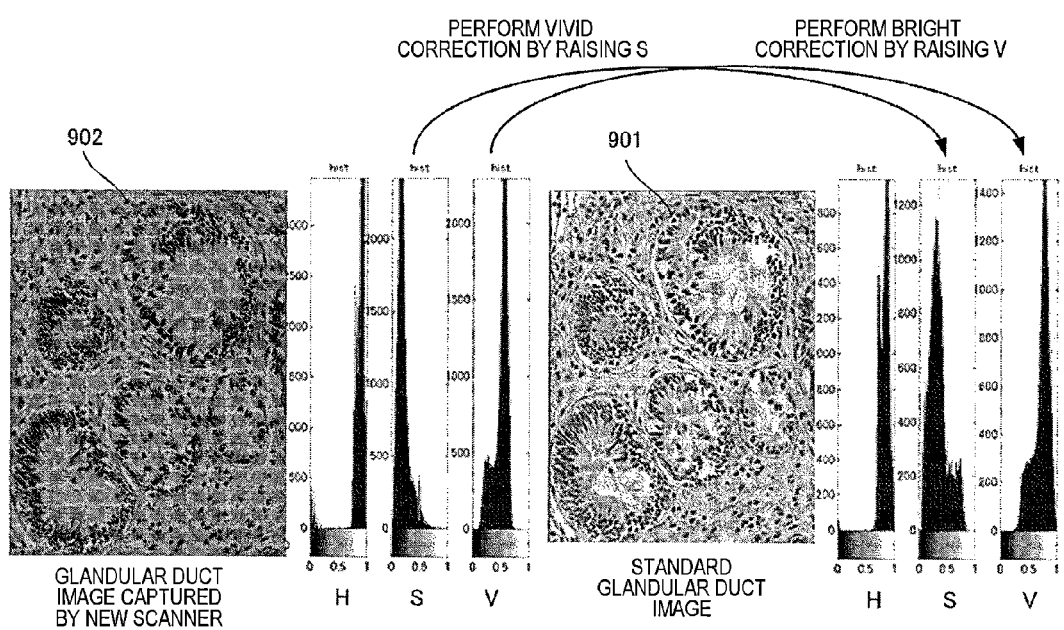
FIG. 9 is a diagram illustrating a specific example of a correction process in the image reading system as the third embodiment of the invention.

First, FIG. 9 is a diagram in which a method of correcting an image region including a glandular duct as biological tissue is described. As compared to a standard image 901 stored in the standard image database 315, a biological image 902 captured by a new scanner is dark, and the chroma is low. This is obvious when the peak values of each histogram of the HSV color space are compared to each other. Particularly, since peak positions of S and V are different from each other, a correction for adjusting them is performed. Specifically, correction information is generated for performing a bright correction by raising V and performing a vivid correction by raising S, with respect to a captured glandular duct image region. For example, as shown in FIG. 6, the correction information is registered so as to perform a correction for setting S to +0.2 and setting V to +0.3 in the glandular duct image region.

Figure 10:
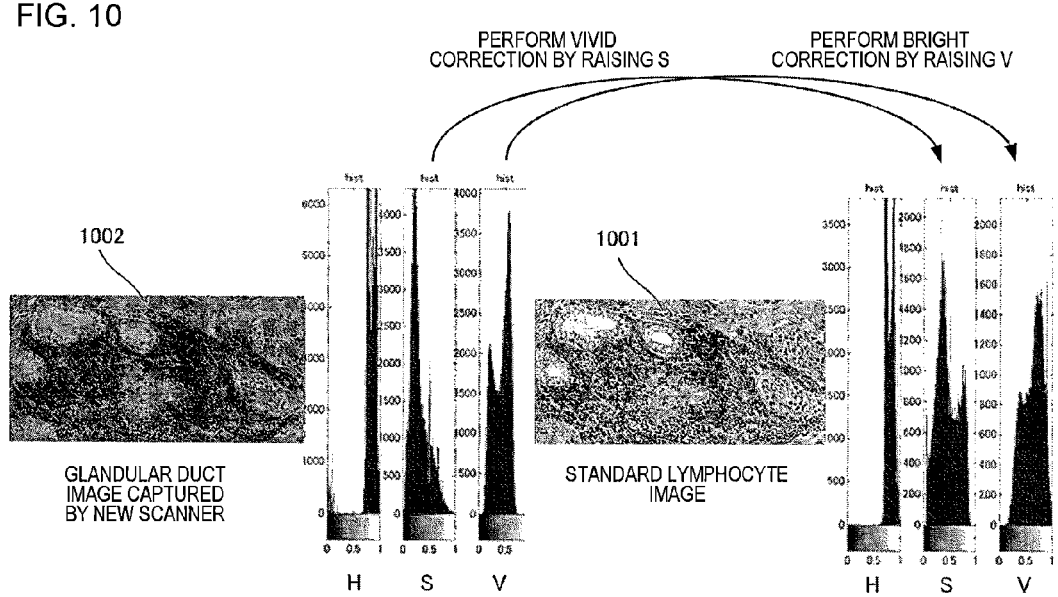
FIG. 10 is a diagram illustrating a specific example of a correction process in the image reading system as the third embodiment of the invention.

FIG. 10 is a diagram in which a method of correcting an image region including a lymphocyte as biological tissue is described. As compared to a standard image 1001 stored in the standard image database 315, a biological image 1002 captured by a new scanner is dark, and the chroma is low. This is obvious when the peak values of each histogram of the HSV color space are compared to each other. Particularly, since the peak values of S and V are different from each other, a correction for adjusting them is performed. Specifically, correction information is generated for performing a bright correction by raising V and performing a vivid correction by raising S, with respect to a captured lymphocyte image region. For example, as shown in FIG. 6, the correction information is registered so as to perform a correction for setting S to +0.1 and setting V to +0.1 in the lymphocyte image region.

Figure 11:
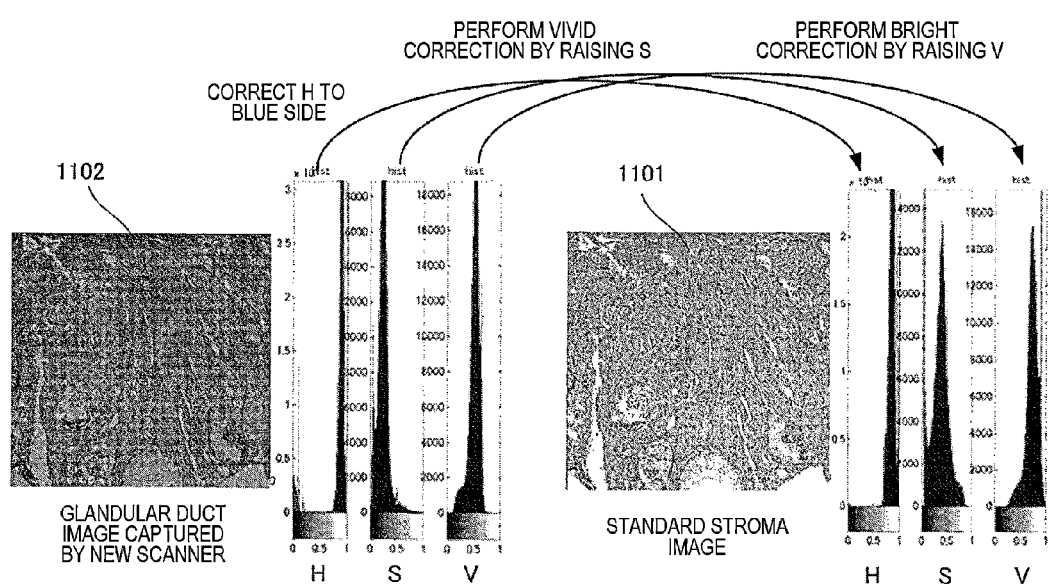
FIG. 11 is a diagram illustrating a specific example of a correction process in the image reading system as the third embodiment of the invention.

FIG. 11 is a diagram in which a method of correcting an image region including a stroma as biological tissue is described. As compared to a standard image 1101 stored in the standard image database 315, a biological image 1102 captured by a new scanner is dark, the chroma is low, and blueness is light. This is obvious when the peak values of each histogram of the HSV color space are compared to each other. Herein, a correction for adjusting the peak values of H, S and V is performed. Specifically, correction information is generated for shifting H to the blue side, performing a bright correction by raising V and performing a vivid correction by raising S, with respect to a captured stroma image region. For example, as shown in FIG. 6, the correction information is registered so as to perform a correction for setting H to +0.1, setting S to +0.1 and setting V to +0.1 in the stroma image region.

Advantage of Embodiments

According to the embodiments as mentioned above, it is possible to add a correction depending on the type of biological tissue included in the biological image which is read by the scanner, and to obtain a corrected image by which an image diagnosis is more easily performed. In addition, the correction process to be added in order to obtain an image close to the standard image is derived, thereby allowing the correction information to be registered in the database. For this reason, even when the scanner of which the image reading characteristics (brightness, hue, blurring or the like) are unclear is connected, a proper correction process is added, thereby allowing an image close to the standard image to be acquired. That is, it is possible to realize an image diagnosis process excellent in versatility which can cope with various scanners.

Other Embodiment

As stated above, although the embodiments of the invention have been set forth in detail, a system or an apparatus in which separate characteristics included in each of the embodiments are combined in any case is also included in the scope of the invention.

In addition, the invention may be applied to a system constituted by a plurality of devices, and may be applied to a single apparatus. Further, the invention can be applied even when an image processing program for realizing functions of the embodiments is supplied to a system or an apparatus directly or remotely. Therefore, an image processing program installed on a computer in order to realize the functions of the invention using the computer, a medium having the program stored thereon, or a WWW server causing the program to be downloaded is also included in the scope of the invention.

Other Expressions of Embodiment

A portion or all of the above-mentioned embodiments can be described as in the following Additions, but are not limited thereto.

(Addition 1)

An image processing apparatus that processes a biological image generated by capturing an image of a biological specimen in an image reading apparatus, including:

an acquisition unit that acquires identification information of the image reading apparatus;

a determination unit that determines a type of biological tissue included in the biological image; and a correction unit that adds a correction process to the biological image in correspondence with the identification information of the image reading apparatus and the type of biological tissue.

(Addition 2)

The image processing apparatus according to Addition 1, further including a storage unit that stores correction information indicating the correction process for each piece of the identification information of the image reading apparatus and the type of biological tissue capable of being included in the biological image, wherein the correction unit adds the correction process to the biological image on the basis of correction information read out from the storage unit, using the identification information of the image reading apparatus and the type of biological tissue.

(Addition 3)

The image processing apparatus according to Addition 1 or 2, wherein the correction unit adds the correction process to the entirety of the biological image.

(Addition 4)

The image processing apparatus according to Addition 1 or 2, wherein the correction unit adds the correction process to an image region of the biological tissue included in the biological image.

(Addition 5)

The image processing apparatus according to any one of Additions 1 to 4, wherein when two or more biological tissues are included in the biological image, the correction unit adds a different correction process to the image region of each biological tissue.

(Addition 6)

The image processing apparatus according to Addition 2, further including:

a determination unit that determines whether the identification information of the image reading apparatus and correction information corresponding thereto are stored in the storage unit; and a notice unit that gives notice of an error message, when the determination unit determines that the identification information of the image reading apparatus and the correction information corresponding thereto are not stored.

(Addition 7)

An image processing apparatus that processes a biological image generated by capturing an image of a biological specimen in an image reading apparatus, including:

an acquisition unit that acquires identification information of the image reading apparatus;

a generation unit that compares a standard image previously stored in a database with the biological image, derives a correction process to be added to the biological image in order to cause approximation to the standard image, and generates correction information indicating the correction process; and a registration unit that registers the identification information of the image reading apparatus and the correction information in the database, in association with a type of biological tissue included in the biological image.

(Addition 8)

The image processing apparatus according to including 7, wherein when the image reading apparatus is not a standard image reading apparatus, the generation unit generates correction information by comparing the standard image acquired by capturing an image of a sampling biological specimen in the standard image reading apparatus with a biological image acquired by capturing an image of the sampling biological specimen in the image reading apparatus.

(Addition 9)

The image processing apparatus according to Addition 7 or 8, wherein the generation unit generates the correction information by comparing a histogram in which the standard image is represented in a predetermined color space with a histogram in which the biological image is represented in a predetermined color space.

(Addition 10)

An image reading apparatus which is capable of being connected to the image processing apparatus according to any one of Additions 1 to 9, including:

a transmission unit that transmits the biological image generated by capturing an image of the biological specimen and the identification information to the image processing apparatus.

(Addition 11)

An image reading apparatus which is capable of being connected to the image processing apparatus according to any one of Additions 1 to 9, including:

a storage unit that stores correction information indicating the correction process for each type of biological tissue capable of being included in the biological image; and a transmission unit that transmits the biological image generated by capturing an image of the biological specimen and the correction information to the image processing apparatus.

(Addition 12)

An image reading apparatus which is capable of being connected to the image processing apparatus according to Addition 8, including:

a storage unit that stores the biological image generated by capturing an image of the sampling biological specimen; and a transmission unit that transmits the biological image to the image processing apparatus.

(Addition 13)

An image processing method that processes a biological image generated by capturing an image of a biological specimen in an image reading apparatus, including:

acquiring identification information of the image reading apparatus;

determining a type of biological tissue included in the biological image; and adding a correction process to the biological image in correspondence with the identification information of the image reading apparatus and the type of biological tissue.

(Addition 14)

An image processing method that processes a biological image generated by capturing an image of a biological specimen in an image reading apparatus, including:

acquiring identification information of the image reading apparatus;

comparing a standard image previously stored in a database with the biological image, deriving a correction process to be added to the biological image in order to cause approximation to the standard image, and generating correction information indicating the correction process; and registering the identification information of the image reading apparatus and the correction information, in association with a type of biological tissue included in the biological image.

(Addition 15)

An image processing program that processes a biological image generating by capturing an image of a biological specimen in an image reading apparatus, the program causing a computer to execute:

a step of acquiring identification information of the image reading apparatus;

a step of determining a type of biological tissue included in the biological image; and a step of adding a correction process to the biological image in correspondence with the identification information of the image reading apparatus and the type of biological tissue.

(Addition 16)

An image processing program that processes a biological image generated by capturing an image of a biological specimen in an image reading apparatus, the program causing a computer to execute:

a step of acquiring identification information of the image reading apparatus;

a step of comparing a standard image previously stored in a database with the biological image, deriving a correction process to be added to the biological image in order to cause approximation to the standard image, and generating correction information indicating the correction process; and a step of registering the identification information of the image reading apparatus and the correction information, in association with a type of biological tissue included in the biological image.

Priority is claimed on Japanese Patent Application No. 2010-079393, filed on Mar. 30, 2010, the content of which is incorporated herein by reference.

The invention claimed is:

1. An image processing apparatus that processes a biological image generated by capturing an image of a biological specimen in an image reading apparatus, comprising:
   an acquisition unit configured to acquire identification information of the image reading apparatus;
   a determination unit configured to determine a type of biological tissue included in the biological image; and
   a correction unit configured to add a correction process to the biological image in correspondence with the identification information of the image reading apparatus and the type of biological tissue.

2. The image processing apparatus according to claim 1, further comprising a storage unit configured to store correction information indicating the correction process for each pair of the identification information of the image reading apparatus and the type of biological tissue capable of being included in the biological image,
   wherein the correction unit is configured to add the correction process to the biological image on the basis of correction information read out from the storage unit, using the identification information of the image reading apparatus and the type of biological tissue.

3. The image processing apparatus according to claim 2, further comprising:
   a determination unit configured to determine whether the identification information of the image reading apparatus and correction information corresponding thereto are stored in the storage unit; and
   a notice unit configured to give notice of an error message, when the determination unit determines that the identification information of the image reading apparatus and the correction information corresponding thereto are not stored.

4. The image processing apparatus according to claim 1, wherein the correction unit is configured to add the correction process to the entirety of the biological image.

5. The image processing apparatus according to claim 1, wherein the correction unit is configured to add the correction process to an image region of the biological tissue included in the biological image.

6. The image processing apparatus according to claim 1, wherein when two or more biological tissues are included in the biological image, the correction unit is configured to add a different correction process to the image region of each biological tissue.

7. An image reading apparatus which is capable of being connected to the image processing apparatus according to claim 1, comprising:

a transmission unit configured to transmit the biological image generated by capturing an image of the biological specimen and the identification information to the image processing apparatus.

8. An image reading apparatus which is capable of being connected to the image processing apparatus according to claim 1, comprising:
   a storage unit configured to store correction information indicating the correction process for each type of biological tissue capable of being included in the biological image; and
   a transmission unit configured to transmit the biological image generated by capturing an image of the biological specimen and the correction information to the image processing apparatus.

9. The image processing apparatus according to claim 1, wherein the correction unit is configured to read out correction information of the image corresponding to a pair of the identification information of the image reading apparatus acquired by the acquisition unit and the type of biological tissue determined by the determination unit, from a database in which correction information of the image is registered for each pair of the identification information of the image reading apparatus and the type of biological tissue, and add the correction process to the biological image on the basis of correction information read out from the database.

10. An image processing apparatus that processes a biological image generated by capturing an image of a biological specimen in an image reading apparatus, comprising:
   an acquisition unit configured to acquire identification information of the image reading apparatus;
   a generation unit configured to compare a standard image previously stored in a database with the biological image, derive a correction process to be added to the biological image in order to cause approximation to the standard image, and generate correction information indicating the correction process; and
   a registration unit configured to register the identification information of the image reading apparatus and the correction information in the database, in association with a type of biological tissue included in the biological image.

11. The image processing apparatus according to claim 10, wherein when the image reading apparatus is not a standard image reading apparatus, the generation unit is configured to generate correction information by comparing the standard image acquired by capturing an image of a sampling biological specimen in the standard image reading apparatus with a biological image acquired by capturing an image of the sampling biological specimen in the image reading apparatus.

12. An image reading apparatus which is capable of being connected to the image processing apparatus according to claim 11, comprising:
   a storage unit configured to store the biological image generated by capturing an image of the sampling biological specimen; and
   a transmission unit configured to transmit the biological image to the image processing apparatus.

13. The image processing apparatus according to claim 10, wherein the generation unit is configured to generate the correction information by comparing a histogram in which the standard image is represented in a predetermined color space with a histogram in which the biological image is represented in a predetermined color space.

14. An image processing method that processes a biological image generated by capturing an image of a biological specimen in an image reading apparatus, comprising:
   acquiring identification information of the image reading apparatus;
   determining a type of biological tissue included in the biological image; and
   adding a correction process to the biological image in correspondence with the identification information of the image reading apparatus and the type of biological tissue.

15. An image processing method that processes a biological image generated by capturing an image of a biological specimen in an image reading apparatus, comprising:
   acquiring identification information of the image reading apparatus;
   comparing a standard image previously stored in a database with the biological image, deriving a correction process to be added to the biological image in order to cause approximation to the standard image, and generating correction information indicating the correction process; and
   registering the identification information of the image reading apparatus and the correction information, in association with a type of biological tissue included in the biological image.

16. A non-transitory information storage medium storing an image processing program that processes a biological image generating by capturing an image of a biological specimen in an image reading apparatus, the program causing a computer to execute:
   a step of acquiring identification information of the image reading apparatus;
   a step of determining a type of biological tissue included in the biological image; and
   a step of adding a correction process to the biological image in correspondence with the identification information of the image reading apparatus and the type of biological tissue.

17. A non-transitory storage medium storing an image processing program that processes a biological image generated by capturing an image of a biological specimen in an image reading apparatus, the program causing a computer to execute:
   a step of acquiring identification information of the image reading apparatus;
   a step of comparing a standard image previously stored in a database with the biological image, deriving a correction process to be added to the biological image in order to cause approximation to the standard image, and generating correction information indicating the correction process; and
   a step of registering the identification information of the image reading apparatus and the correction information, in association with a type of biological tissue included in the biological image.

* * * * *